United States Patent
Muramatsu

[11] Patent Number: 5,114,124
[45] Date of Patent: May 19, 1992

[54] FLUID-FILLED ELASTIC MOUNT HAVING MEANS FOR CONTROLLING PRESSURE IN AIR CHAMBER IN RESONANCE MEMBER IN PRESSURE-RECEIVING CHAMBER

[75] Inventor: Atsushi Muramatsu, Komaki, Japan
[73] Assignee: Tokai Rubber Industries, Ltd., Japan
[21] Appl. No.: 598,193
[22] Filed: Oct. 16, 1990

[30] Foreign Application Priority Data
Oct. 21, 1989 [JP] Japan ................. 1-123282[U]

[51] Int. Cl.⁵ ............................................. F16M 1/00
[52] U.S. Cl. ......................... 267/140.1 A; 248/562; 248/636
[58] Field of Search ............... 248/562, 566, 636, 638; 267/140.1 A, 140.1 AE, 140.1 R, 35, 219, 220

[56] References Cited
U.S. PATENT DOCUMENTS
4,757,982 7/1988 Andrä et al. .................. 267/219
4,840,358 7/1989 Hoying et al. ........... 267/140.1 AE FOREIGN PATENT DOCUMENTS
55-107142 8/1980 Japan .
60-104824 6/1985 Japan .
60-249749 12/1985 Japan .
0266238 11/1988 Japan ........................... 267/140.1

Primary Examiner—Robert J. Oberleitner
Assistant Examiner—Chris Schwartz
Attorney, Agent, or Firm—Parkhurst, Wendel & Rossi

[57] ABSTRACT

A fluid-filled elastic mount having a first and a second support structure, an elastic body interposed between the two support structures, a partition member cooperating with the elastic body to define a pressure-receiving chamber, a flexible diagraphm cooperating with the partition member to define an equilibrium chamber, and a resonance member fixedly disposed in the pressure-receiving chamber and including a flexible film which at least partially defines an air chamber. The elastic mount includes a pressure control device for changing the pressure in the air chamber, thus changing the vibration damping or isolating characteristics for the elastic mount.

6 Claims, 2 Drawing Sheets

FLUID-FILLED ELASTIC MOUNT HAVING MEANS FOR CONTROLLING PRESSURE IN AIR CHAMBER IN RESONANCE MEMBER IN PRESSURE-RECEIVING CHAMBER

BACKGROUND OF THE INVENTION

1. Field of the Invention

The present invention relates generally to a fluid-filled elastic mount for damping or isolating vibrations based on flows of a non-compressible fluid contained therein. More particularly, the present invention is concerned with such a fluid-filled elastic mount suitably used as an engine mount of a motor vehicle, for example, which is provided with means for changing the vibration damping or isolating characteristics.

2. Discussion of the Prior Art

An elastic mount is known as a vibration damping member interposed between two members of a vibration system, for flexibly connecting these two members. This type of elastic mount usually includes a first and a second support structure which are spaced apart from each other in a load-receiving direction and are elastically connected to each other by an elastic body interposed therebetween. The elastic mount of this type is widely used for motor vehicles, for example, as a mount for mounting the engine on the vehicle body.

Recently, there is proposed a so-called fluid-filled elastic mount, in an effort to meet increasing requirements for improved vibration damping or isolating capability on the motor vehicles. An example of such a fluid-filled elastic mount is disclosed in laid-open Publication No. 55-107142 of unexamined Japanese Patent Application. The elastic mount disclosed in this publication includes a partition member supported by the second support structure so as to extend in the pressure-receiving chamber in a direction substantially perpendicular to the load-receiving direction, and thereby cooperate with the elastic body to at least partially define a pressure-receiving chamber on the side of the first support structure. The elastic mount also includes a flexible diaphragm which cooperates with the partition wall and the second support structure to define a variable-volume equilibrium chamber on the side of the second support structure. The pressure-receiving and equilibrium chambers are filled with a non-compressible fluid, and communicate with each other by an orifice passage. A pressure in the pressure-receiving chamber changes due to an elastic deformation of the elastic body upon application of vibrations in the load-receiving direction. This fluid-filled elastic mount isolates the input vibrations based on the resonance of the fluid mass flowing through the orifice passage, more effectively than the elastic mount which relies on only the elastic property of the elastic body for damping the input vibrations.

The required vibration damping or isolating characteristic of the fluid-filled elastic mount of the type discussed above differs depending upon the frequency of the vibrations applied. Therefore, the fluid-filled elastic mount must exhibit different vibration damping or isolating characteristics with respect to different frequency bands of the input vibrations. For example, the fluid-filled elastic mount when used as a vehicle engine mount is required to exhibit a high degree of damping characteristic with respect to low-frequency vibrations having frequencies in the neighborhood of 10–30 Hz, such as engine shake and bounce, and exhibit a sufficiently low dynamic spring constant with respect to medium- to high-frequency vibrations having frequencies of about 100–200 Hz, such as secondary vibrations of the engine and booming noise, while the vehicle is running. While the vehicle is at a stop with the engine idling, the fluid-filled elastic mount is required to exhibit a sufficiently low dynamic spring constant with respect to low-frequency vibrations having frequencies of about 15–30 Hz such as engine idling vibrations.

However, an improvement in the vibration isolating function based on the resonance of the fluid mass flowing through the orifice passage is provided with respect to only the vibrations whose frequencies are in the neighborhood of the frequency to which the orifice passage is tuned. The orifice passage is usually tuned by suitably determining its length and cross sectional area. Once the orifice passage is structurally tuned, the vibration damping or isolating characteristics of the elastic mount are fixed and are not adjustable. For instance, the orifice passage is tuned to effectively damp engine shake and bounce and other low-frequency vibrations based on the resonance of the fluid mass flowing through the orifice passage. In this case, the damping or isolating function of the elastic mount is considerably deteriorated with respect to the secondary vibrations of the engine, booming noises and other medium-to high-frequency vibrations, and with respect to the engine idling vibrations. Thus, the known fluid-filled elastic mount is not capable of effectively dealing with the various types of input vibrations having different frequencies.

In view of the above drawback of the known fluid-filled elastic mount, a fluid-filled elastic mount is proposed as disclosed in laid-open Publication Nos. 60-104824 and 60-249749, which has a resonance member supported by the first support structure such that a head portion of the resonance member extends in the pressure-receiving chamber in a direction substantially perpendicular to the load-receiving direction. The head portion of the resonance member and a surface defining the pressure-receiving chamber cooperate with each other to define therebetween a restricted portion, through which the fluid flows upon application of vibrations. Based on the resonance of the fluid flowing through this restricted portion of the pressure-receiving chamber, the proposed fluid-filled elastic mount exhibits a sufficiently low dynamic spring constant with respect to the medium- to high-frequency vibrations, which cause the orifice passage to operate as if the passage was substantially closed.

However, the fluid-filled elastic mount provided with the resonance member as discussed above still suffers from a drawback. Namely, this elastic mount is almost incapable of selectively exhibiting two different vibration damping or isolating characteristics, a high vibration damping effect with respect to the engine shake and bounce, and a low dynamic spring constant with respect to the engine idling vibrations, since these two types of vibrations have substantially the same frequency range. In this respect, there has been a long-felt need to improve the known fluid-filled elastic mount which utilizes a resonance member as described above.

SUMMARY OF THE INVENTION

It is therefore an object of the present invention to provide a fluid-filled elastic mount which is capable of selectively exhibiting different vibration damping or isolating characteristics, depending upon the type of vibrations applied thereto, so that the different types of input vibrations can be effectively damped or isolated.

The above object may be achieved according to the principle of the present invention, which provides a fluid-filled elastic mount comprising: (a) a first support structure and a second support structure which are spaced apart from each other in a load-receiving direction in which vibrations are applied to the elastic mount; (b) an elastic body interposed between the first and second support structures for elastically connecting the first and second support structures, the elastic body and the second support structure at least partially defining an enclosure between the first and second support structures; (c) a partition member supported by the second support structure so as to extend in a direction substantially perpendicular to the load-receiving direction, and thereby divide the enclosure into a pressure-receiving chamber on one of opposite sides thereof on the side of the first support structure, and a variable-volume equilibrium chamber on the other side thereof, the pressure-receiving and equilibrium chambers being filled with a non-compressible fluid, a pressure in the pressure-receiving chamber changing due to elastic deformation of the elastic body upon application of the vibrations in the load-receiving direction; (d) a flexible diaphragm cooperating with the partition wall and the second support structure to define the equilibrium chamber; (e) means for defining an orifice passage for fluid communication between the pressure-receiving and equilibrium chambers; (f) a resonance member supported by the first support structure and having a head portion which extends in the pressure-receiving chamber in a direction substantially perpendicular to the load-receiving direction, the head portion and a surface defining the pressure-receiving chamber cooperating to define therebetween a restricted portion through which the fluid flows upon application of the vibrations, the resonance member further having a flexible wall portion which at least partially defines an air chamber in the head portion, so that a pressure change in the pressure-receiving chamber is transferred to the air chamber by means of elastic displacement of the flexible wall portion; and (g) pressure control means for changing a pressure in the air chamber.

The fluid-filled elastic mount of the present invention constructed as described above is capable of changing the dynamic spring constant or damping coefficient, by changing the pressure in the air chamber provided in the head portion of the resonance member. Accordingly, the vibration damping or isolating characteristic of the present elastic mount can be suitably changed depending upon the type of the input vibrations. In other words, the present fluid-filled elastic mount exhibits a high damping or isolating effect for various types of vibrations which are generated under different environmental conditions.

The pressure control means may include a vacuum pressure source for providing a reduced pressure lower than an atmospheric pressure, and switching means which is connected to the vacuum pressure source and which is operable between a first position for communication of the air chamber with an atmosphere having the atmospheric pressure, and a second position for communication of the air chamber with the vacuum pressure source.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
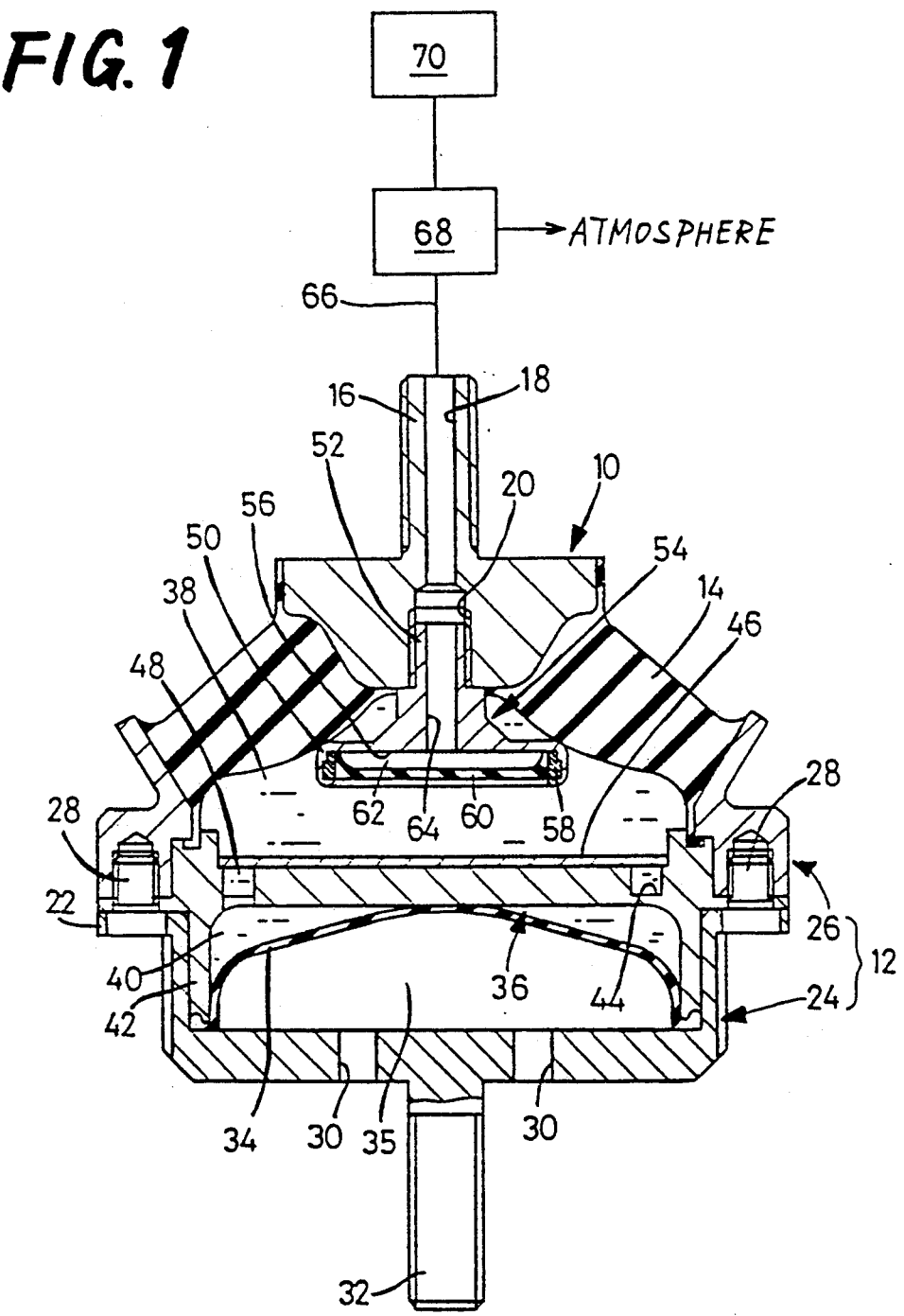
FIG. 1 is an elevational view in axial cross section of one embodiment of a fluid-filled elastic mount of the present invention in the form of an engine mount for a motor vehicle.

Referring first to FIG. 1 showing the vehicle engine mount as one embodiment of the fluid-filled elastic mount of this invention, reference numerals 10 and 12 denote a first and a second rigid support structure, respectively. These first and second support structures 10, 12 are spaced apart from each other by a suitable distance in a load-receiving direction in which vibrations are received by the elastic mount. Between the first and second support structures 10, 12, there is formed an elastic body 14 so that the two structures 10, 12 are elastically connected to each other. The elastic mount is installed on a vehicle such that the first support structure 10 is fixed to an engine unit of the vehicle while the second support structure 12 is fixed to a body of the vehicle. Thus, the engine unit is flexibly mounted on the vehicle body in a vibration damping or isolating manner.

More specifically, the first support structure 10 includes a body portion having a generally truncated conical shape, and a bolt portion 16 which is formed as an integral part of the body portion. The bolt portion 16 extends from the large-diameter end face of the body portion in the load-receiving direction, axially outwardly of the elastic mount. The first support structure 10 has an air passage 18 axially formed through the bolt portion 16 as well as the body portion. The air passage 18 has a tapped end portion 20 which is open in the small-diameter end face of the body portion of the structure 10.

On the other hand, the second support structure 12 consists of a generally cup-shaped bottom member 24 with an outward flange 22 formed at its open end on the side of the first support structure 10, and a cylindrical member 26 fixed at one axial end thereof to the bottom member 24. Described more particularly, the cylindrical member 26 rests on the outward flange 22 of the bottom member 24, and is bolted to the outward flange 22 by a plurality of fixing bolts 28 that are spaced from each other in the circumferential direction of the members 24, 26. Thus, the second support structure 12 is generally cup-shaped, with its open end positioned on the side of the first support structure 10. The bottom member 24 has a plurality of through-holes 30 formed through its bottom wall, and a bolt portion 32 which extends from the outer surface of the bottom portion in the load-receiving direction, axially outwardly of the elastic mount.

The first and second support structures 10, 12 are positioned concentrically or coaxially with each other, with a suitable axial distance therebetween, such that the cup-shaped second support structure 12 is open facing the small-diameter end face of the first support structure 10. Between these two support structures 10, 12, there is formed by vulcanization the elastic body 14, which has a generally truncated conical shape. The elastic body 14 is bonded at its small-diameter end to the outer surface of the first support structure 10 and at its large-diameter end to the inner surface of the open end portion of the second support structure 12. Thus, the first and second support structures 10, 12 and the elastic body 14 are integrally assembled together such that the two support structures 10, 12 are elastically connected to each other by the elastic body 14.

In a bottom portion of the cup-shaped second support structure 12, there is disposed a circular thin-walled flexible diaphragm 34 such that the space defined by the first and second support structures 10, 12 and the elastic body 14 is divided by the diaphragm 34 into an enclosure on the side of the first support structure, and an air space 35 on the side of the bottom wall of the second support structure 12. The air space 35 communicates with the atmosphere through the through-holes 30.

The above-indicated enclosure defined by the first and second support structures 10, 12, elastic body 14 and the flexible diaphragm 34 is divided by a generally disk-like partition member 36 into a pressure-receiving chamber 38 on one of opposite sides of the partition member 36 on the side of the first support structure 10, and a variable-volume equilibrium chamber 40 on the other side of the partition member 36 on the side of the diaphragm 34. The pressure-receiving and equilibrium chambers 38, 40 are filled with a suitable non-compressible fluid. The partition member 36 is supported by the second support structure 12, so as to extend in the radial direction of the elastic mount, such that a peripheral portion of the partition member 36 is gripped by and between connecting or joining portions of the bottom and cylindrical members 24, 26. Upon application of vibrations between the first and second support structures 10, 12 in the load-receiving direction (axial direction), a pressure of the fluid in the pressure-receiving chamber 38 changes as a result of a volumetric change of the chamber 38 due to elastic deformation of the elastic body 14. On the other hand, the variable-volume equilibrium chamber 40 which communicates with the pressure-receiving chamber 38 as described below will not undergo a pressure change, since the pressure change is absorbed by a volumetric change of the chamber 40 which occurs due to elastic displacement of the flexible diaphragm 34.

The partition member 36 is formed with a cylindrical portion 42 extending from the periphery toward the bottom wall of the bottom member 24 of the second support structure 12. This cylindrical portion 42 cooperates with the bottom member 24 to fix the flexible diaphragm 34, such that the periphery of the diaphragm 34 is fluid-tightly gripped between the end face of the cylindrical portion 42 and the inner surface of the bottom wall of the bottom member 24. Thus, the fluid tightness of the equilibrium chamber 40 is maintained.

The non-compressible fluid contained in the pressure-receiving and equilibrium chambers 38, 40 preferably has a kinematic viscosity of 500 centistokes or lower, for assuring a sufficient degree of fluidity of the fluid. For example, water, alkylene glycol, polyalkylene glycol, silicone oil or a mixture thereof may be desirably used as the non-compressible fluid.

The disk-like partition member 36 has a U-groove 44 formed in a radially outer portion thereof, in the circumferential direction over a suitable circumferential length. The U-groove 44, which is formed in one of opposite surfaces of the partition member 36 on the side of the pressure-receiving chamber 38, is closed by a closure disk 46 superposed on the above-indicated one surface of the partition member 36. The closure disk 46 and the U-groove 44 cooperate with each other to define an orifice passage 48 which communicates at one end thereof with the pressure-receiving chamber 38 and at the other end thereof with the equilibrium chamber 40. The orifice passage 48 therefore maintains fluid communication between the two chambers 38, 40. Upon application of vibrations between the two support structures 10, 12, the non-compressible fluid is forced to flow through this orifice passage 48, due to a pressure difference between the pressure-receiving and equilibrium chambers 38, 40. As a result of the restricted flows of the fluid through the orifice passage 48, or based on the resonance of the fluid mass flowing through the orifice passage 48, the elastic mount exhibits an intended vibration damping effect, as well known in the art. In the present embodiment, the orifice passage 48 is tuned so that the elastic mount exhibits a high damping effect with respect to the low-frequency vibrations having frequencies of about 10–30 Hz, based on the resonance of the fluid flowing through the passage 48. Accordingly, the low-frequency high-amplitude vibrations such as the engine shake and bounce can be effectively damped.

A resonance member 54 is fixed to the first support structure 10. The resonance member 54 has a generally disk-like head portion 50, and a stem portion 52 extending from the head portion 50. The stem portion 52 has an externally threaded end portion which is screwed to the tapped end portion of the air passage 18 of the first support structure 10. With the stem portion 52 thus fixed to the body portion of the first support structure 10, the head portion 50 extends in the pressure-receiving chamber 38 in a direction substantially perpendicular to the load-receiving direction. When the present engine mount is installed on the vehicle with the weight of the engine unit acting on the first support structure 10, the resonance member 54 is displaced together with the first support structure 10 in the axial direction (load-receiving direction), until the resonance member 54 is positioned almost in the middle of the pressure-receiving chamber 38. In this condition, the periphery of the head portion 50 of the resonance member 54 cooperates with the inner surface of the elastic body 14 to provide the pressure-receiving chamber 38 with an annular restricted portion (which is not shown in FIG. 1 since the figure shows the engine mount before it is installed on the vehicle). That is, the pressure-receiving chamber 38 is substantially or practically divided by the resonance member 54 into an upper section on the side of the first support structure 10 and a lower section on the side of the partition member 36. These two sections of the pressure-receiving chamber 38 communicate with each other through the annular restricted portion of the chamber 38.

When the vibrations are applied between the first and second support structures 10, 12, the resonance member 54 (more precisely, the head portion 50) is periodically displaced in the axial direction within the pressure-receiving chamber 38, whereby the fluid is forced to flow through the restricted portion of the chamber 38 between the upper and lower sections on the opposite sides of the head portion 50. Accordingly, the input vibrations can be isolated based on the resonance of the fluid flowing through the restricted portion, as well known in the art. In the present engine mount, the restricted portion is tuned so that the engine mount exhibits a sufficiently low dynamic spring constant for effectively isolating high-frequency small-amplitude vibrations such as booming noises having frequencies of about 100–200 Hz, based on the resonance of the fluid mass flowing through the restricted portion.

The head portion 50 of the resonance member 54 has a round recess 56 which is open in the surface facing the partition member 36. A retainer ring 58 is press-fitted in the recess 56. The retainer ring 58 carries a circular, thin flexible film 60 secured thereto by vulcanization so as to close the opening of the ring. Thus, the opening of the recess 56 is fluid-tightly closed by the retainer ring 58 and the flexible film 60, whereby an air chamber 62 is formed within the head portion 50. The flexible film 60 is made of an elastic rubber material and serves as a flexible wall portion which partially defines the air chamber 62, and whose elastic deformation or displacement permits a pressure change in the pressure-receiving chamber 38 to be transferred to the air chamber 62.

The stem portion 52 of the resonance member 54 has a connecting passage 64 formed axially therethrough for communication at one end thereof with the air chamber 62 and at the other end with the air passage 18. The air passage 18 is connected to a vacuum pressure source 70 by a conduit 66. The vacuum pressure source 70 provides a reduced pressure lower than the atmospheric pressure. In the conduit 66, there is provided a switch valve 68 which is selectively placed in a first position for communication of the air chamber 62 with the atmosphere (atmospheric pressure), and a second position for communication of the air chamber 62 with the vacuum pressure source 70.

When the air chamber 62 is held in communication with the atmosphere through the conduit 66 and the switch valve 68 placed in the first position, as indicated in FIG. 1, a pressure change in the pressure-receiving chamber 38 as a result of vibrations applied between the first and second support structures 10, 12 fixed to the engine unit and the vehicle body is transferred to the air chamber 62 by means of elastic oscillatory displacement or deformation of the flexible film 60 which partially defines the air chamber 62. In other words, the pressure change in the pressure-receiving chamber 38 is absorbed by the displacement of the flexible film 60.

In the above condition, the elastic displacement of the flexible film 60 substantially prevents flows of the non-compressible fluid through the orifice passage 48, with the pressure change in the chamber 38 effectively absorbed by the air chamber 62. Accordingly, an increase in the dynamic spring constant due to the flows of the fluid through the orifice passage 48 can be effectively avoided. Thus, the engine mount exhibits a relatively soft spring characteristic, when the air chamber 62 is open to the atmosphere through the switch valve 68.

Figure 2:
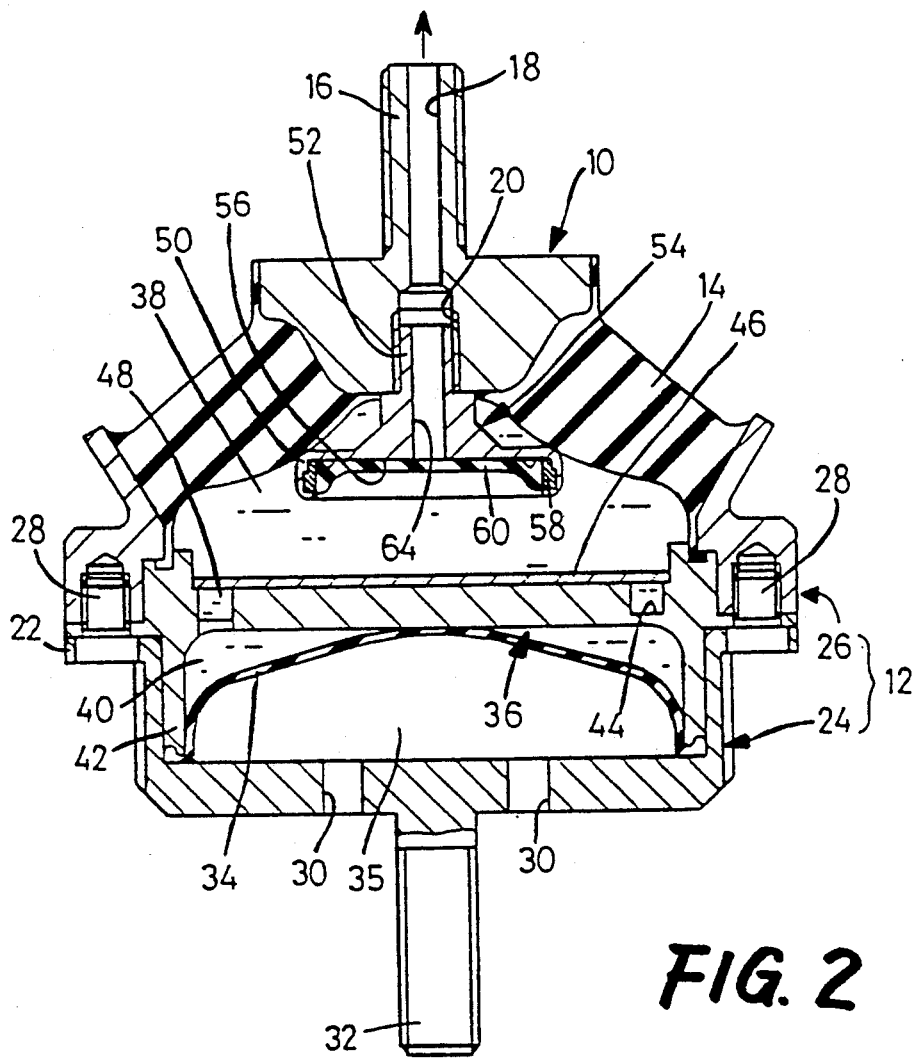
FIG. 2 is an elevational view in axial cross sectional of the engine mount, when a vacuum pressure is applied to an air chamber in a resonance member of the engine mount.

When the switch valve 68 is operated to the second position for communication of the air chamber 62 with the vacuum pressure source 70, the flexible film 60 is sucked by the reduced pressure, against the surface of the head portion 50 which cooperates with the film 60 to define the air chamber 62, as shown in FIG. 2. Consequently, free displacement or deformation of the flexible film 60 is inhibited.

In the above condition, the pressure change which occurs in the pressure-receiving chamber 38 upon application of vibrations to the engine mount is not absorbed by the air chamber 62, whereby the pressure change causes the non-compressible fluid to flow through the orifice passage 48, and through the restricted portion of the chamber 38 defined by the head portion 50 and the elastic body 14. Accordingly, the engine mount exhibits a high damping effect with respect to the low-frequency vibrations, based on the resonance of the fluid flowing through the orifice passage 48, and also exhibits a low dynamic spring constant with respect to the medium- to high-frequency vibrations, based on the resonance of the fluid flowing through the restricted portion provided by the head portion 50.

The present engine mount is adapted to control the switch valve 68 depending upon the running condition of the vehicle, so that the engine mount exhibits suitable vibration damping or isolating characteristics depending upon the type of vibrations applied, so as to significantly improve the driving comfort. Described in more detail, the air chamber 62 is connected to the vacuum pressure source 70 when the vehicle is running, and is open to the atmosphere when the vehicle is at a stop with the engine idling. According to this control arrangement, the orifice passage 48 provides a sufficiently high damping effect with respect to engine shake and other low-frequency vibrations usually generated during running of the vehicle, and the restricted portion of the pressure-receiving chamber 38 provides a sufficiently lowered dynamic spring constant with respect to booming noise and other medium- to high-frequency vibrations also generated during running of the vehicle. On the other hand, the elastic displacement of the flexible film 60 or pressure absorbing action of the air chamber 62 permits an effectively lowered dynamic spring constant of the engine mount, with respect to the engine idling vibrations generated while the vehicle is parked with the engine idling.

Since the air chamber 62 partially defined by the flexible film 60 is provided within the resonance member 54, the provision of the air chamber 62 for absorbing the pressure change in the pressure-receiving chamber 38 will not increase the size of the engine mount. Further, since the passages 18, 64 are formed through the first support structure 10 and the resonance member 54, the mechanism for changing the pressure in the air chamber 62 will not increase the size of the engine mount, nor increase the number of components provided on the engine mount or complicate the construction of the engine mount.

While the present invention has been described in its presently preferred embodiment with a certain degree of particularity, for illustrative purpose only, it is to be understood that the invention is not limited to the details of the illustrated embodiment, but may be embodied otherwise.

For example, the flexible film 60 made of an elastic rubber material to partially define the air chamber 62 need not have an elastic property, and may be replaced by any flexible member, provided that the flexible member is relatively easily displaceable due to a pressure change in the pressure-receiving chamber 38.

In the illustrated embodiment, the air chamber 62 is opened to the atmosphere through the switch valve 68, as needed. However, the atmosphere may be replaced by a pressure source providing a pressure higher than the atmospheric pressure. In this case, the air chamber 62 is selectively connected to the vacuum pressure source 70 or the higher-than-atmospheric pressure source, through the switch valve 68. Further, the switch valve 68 may be adapted to close the conduit 66 with the air chamber 62 held substantially at the atmospheric pressure, rather than maintain communication of the air chamber 62 with the atmosphere, when the valve 68 is placed in the first position. In this case, the compression and expansion of the air having the atmospheric pressure permits oscillatory displacement of the flexible film 60 upon application of vibrations to the engine mount.

The other components of the engine mount such as the members defining the orifice passage 48 and the partition member 36 are not limited to the details of the illustrated embodiment, but may be modified as needed.

While the illustrated embodiment of the invention is adapted to be used as a vehicle engine mount, the principle of the invention is equally applicable to any fluid-filled elastic mounts other than the engine mount, for example, to a differential gear mount and a body mount for motor vehicles, and even applicable to fluid-filled elastic vibration damping/isolating components used for devices and equipment other than those on the motor vehicles.

It will be understood that the present invention may be embodied with various other changes, modifications and improvements, which may occur to those skilled in the art, without departing from the spirit and scope of the invention defined in the following claims.

What is claimed is:

1. A fluid-filled elastic mount comprising:
    a first support structure and a second support structure which are spaced apart from each other in a load-receiving direction in which vibrations are applied to the elastic mount, said first support structure having an air passage;
    an elastic body interposed between said first and second support structures for elastically connecting the first and second support structures, said elastic body and said second support structure at least partially defining an enclosure between said first and second support structures;
    a partition member supported by said second support structure so as to extend in a direction substantially perpendicular to said load-receiving direction, and thereby divide said enclosure into a pressure-receiving chamber on one of opposite sides thereof on the side of said first support structure, and a variable-volume equilibrium chamber on the other side thereof, said pressure-receiving and equilibrium chambers being filled with a non-compressible fluid, a pressure in said pressure-receiving chamber changing due to elastic deformation of said elastic body upon application of the vibrations in said load-receiving direction:
    a flexible diaphragm cooperating with said partition wall and said second support structure to define said equilibrium chamber;
    means for defining an orifice passage for fluid communication between said pressure-receiving and equilibrium chambers;
    a resonance member comprising a stem portion fixed to said first support structure and a head portion which is supported by said stem portion so as to extend in said pressure-receiving chamber in a direction substantially perpendicular to said load-receiving direction, said head portion and a surface defining said pressure-receiving chamber cooperating to define therebetween a restricted portion through which said fluid flows upon application of said vibrations, said head portion including a recess open toward said partition member;
    said resonance member further comprising a flexible wall portion which closes said recess to thereby define an air chamber in said head portion, so that a pressure change in said pressure-receiving chamber is transferred to said air chamber by means of elastic displacement of said flexible wall portion said stem portion comprises a connecting passage to connect said air chamber and said air passage; and
    pressure control means for changing a pressure in said air chamber.

2. A fluid-filled elastic mount of claim 1, wherein said pressure control means comprises a vacuum pressure source for providing a reduced pressure lower than an atmospheric pressure, and switching means which is connected to said air passage and said vacuum pressure source and which is operable between a first position for communication of said air chamber with an atmosphere having the atmospheric pressure, and a second position for communication of said air chamber with said vacuum pressure source.

3. A fluid-filled elastic mount of claim 1 wherein said pressure control means has a conduit connecting said air passage to said vacuum pressure source through said switching means.

4. A fluid-filled elastic mount of claim 1, wherein said flexible wall portion consists of a flexible film made of an elastic rubber material.

5. A fluid-filled elastic mount of claim 1, wherein said means for defining an orifice passage comprises said partition member having a groove, and a closure member which closes said groove, said groove communicating at one end thereof with said pressure-receiving chamber and at the other end thereof with said variable-volume equilibrium chamber.

6. A fluid-filled elastic mount comprising:
    a first support structure and a second support structure which are spaced apart from each other in a load-receiving direction in which vibrations are applied to the elastic mount;
    an elastic body interposed between said first and second support structures for elastically connecting the first and second support structures, said elastic body and said second support structure at least partially defining an enclosure between said first and second support structures;
    a partition member supported by said second support structure so as to extend in a direction substantially perpendicular to said load-receiving direction, and thereby divide said enclosure into a pressure-receiving chamber on one of opposite sides thereof on the side of said first support structure, and a variable-volume equilibrium chamber on the other side thereof, said pressure-receiving and equilibrium chambers being filled with a non-compressible fluid, a pressure in said pressure-receiving chamber changing due to elastic deformation of said elastic body upon application of the vibrations in said load-receiving direction;
    a flexible diaphragm cooperating with said partition wall and said second support structure to define said equilibrium chamber;

means for defining an orifice passage for fluid communication between said pressure-receiving and equilibrium chambers;

a resonance member supported by said first support structure and having a head portion which extends in said pressure-receiving chamber in a direction substantially perpendicular to said load-receiving direction, said head portion and a surface defining said pressure-receiving chamber cooperating to define therebetween a restricted portion through which said fluid flows upon application of said vibrations;

said resonance member further having a flexible wall portion which at least partially defines an air chamber in said head portion. so that a pressure change in said pressure-receiving chamber is transferred to said air chamber by means of elastic displacement of said flexible wall portion;

said head portion includes a retainer ring which is fixed in said recess and which is attached to said flexible wall portion such that said flexible wall portion closes an opening of said retainer ring; and pressure control means for changing a pressure in said air chamber.

* * * * *